Patented May 27, 1941

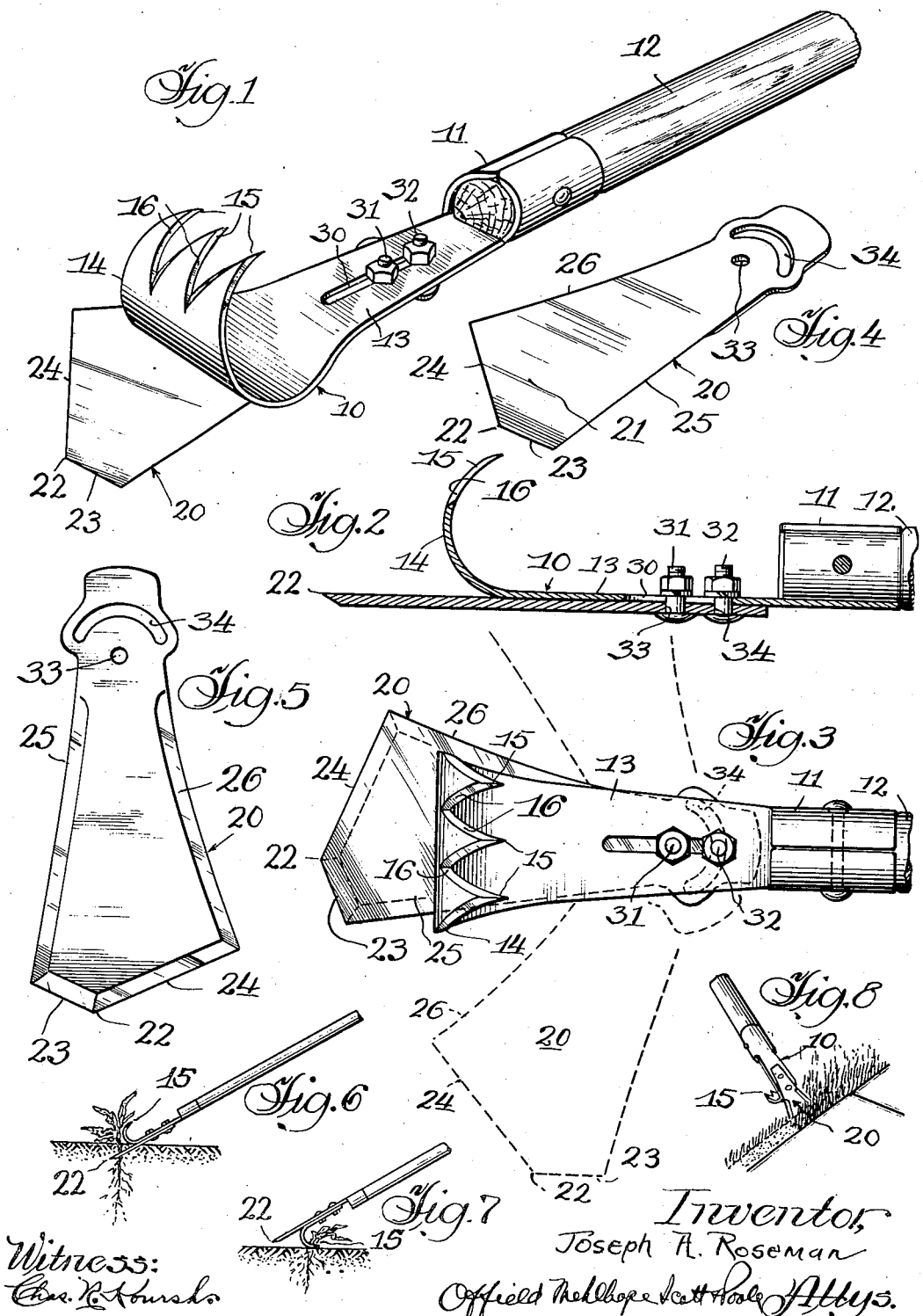

2,243,127

UNITED STATES PATENT OFFICE 2,243,127

WEEDING AND CULTIVATING TOOL

Joseph A. Roseman, Glenview, Ill.

Application October 11, 1937, Serial No. 168,327

4 Claims. (Cl. 7—14.3)

This invention relates to improvements in cultivating tools especially designed for weeding, raking, edging, trimming, planting or pruning, but is further adapted for a wide variety of other uses in gardening and care of golf links, parks and the like.

The principal object of the invention is to provide a simple, inexpensive and efficient tool for the purposes above described, as will hereinafter more fully appear from the following description:

The invention may best be understood by reference to the accompanying drawing, in which Fig. 1 is a perspective view of the tool with the handle broken away, showing the blade in a preferred position for weeding.

Fig. 2 is a longitudinal sectional view of the tool shown in Fig. 1.

Fig. 3 is a plan view of the tool shown in the preceding figure, but indicating in dotted lines certain alternative adjustable positions of the blade.

Fig. 4 is a detail perspective view showing one face of the blade.

Fig. 5 is a plan view of the reverse side of the blade.

Fig. 6 is a view illustrating the first step in one method of use of the tool in extracting weeds of certain kinds.

Fig. 7 illustrates the second step in extracting weeds after cutting the roots as shown in Fig. 6.

Fig. 8 illustrates another application of the tool in edging walks or the like.

Referring now more particularly to the tool illustrated in the drawing and forming one embodiment of my invention, a hook-shaped member or claw indicated generally at 10 comprises a base 11 suitably connected to an elongated handle 12, a relatively flat shank 13 and a curved, widened hook portion 14 at its outer end, terminating in a plurality of teeth 15, three of which are provided in the form shown herein. The claw 10 is preferably made of tempered steel or similar metal, and the teeth 15 are sharpened along beveled sides 16 so as to provide a plurality of cutting edges meeting between said teeth in V-shaped troughs, as clearly seen in Fig. 3. It will be noted further that the teeth 15 form continuations of the upward and inward curve of the claw member 10, and terminate at an angle approximately 45° to the plane of the shank 13, so as to be substantially tangent with the ground when the claw member is used with a raking action, as will hereinafter more fully appear.

A cutting blade 20 is fastened to the lower face of the shank 13 and projects beyond the end of the claw, as clearly shown in the drawing. Said blade has a flared end cutting portion preferably formed with a point 22 and beveled front cutting edges 23 and 24, said bevels preferably being all on one side of the blade. (See Fig. 5.)

In the form shown, the point 22 is offset toward one side of the blade, and the sides of the blade are also sharpened with beveled edges 25 and 26.

The blade 20 is supported on the shank 13 for longitudinally slidable adjustment, in order to provide varying lengths of the blade 20 with respect to the claw 10. Said blade is also arranged for lateral swinging adjustment so as to position it at varying angles with respect to the claw. In the form shown, the adjustable blade support consists of a longitudinally extending, centrally disposed slot 30 formed in the shank 13, and two bolts 31 and 32 slidable therealong. The front bolt 31 passes through a hole 33 in said blade to form a pivotal axis for the latter, and the rear bolt 32 extends through an arcuate slot 34 in said blade. The arrangement is such that when the bolts 31 and 32 are loosened, the entire blade can be shifted longitudinally of the shank, or swing laterally to various angles relative to the shank, but can be fixed rigidly in any desired position by tightening said bolts.

Referring now to the method of use of my improved tool for extracting weeds such as dandelions, plantain or the like, the blade is preferably adjusted substantially in the position shown in Figs. 1, 2 and 3. The handle 10 is sufficiently long to permit the operator to manipulate the tool in comfortable standing position. The blade is first pushed into the ground at an angle immediately adjacent the weed to be extracted. The overhanging curved portion of the claw serves as a stop to limit the amount of penetration and also preventing damage to the surrounding grass by excessive displacement thereof. The roots of the plant are thus severed by the blade, as indicated in Fig. 6. Although the blade is reversible with respect to the claw, I find that the tool gives best results for weeding by disposing the entering beveled cutting surfaces 23 and 24 on the bottom side of the blade, as shown. With this arrangement, the weed is lifted and freed from the surrounding ground, thereby facilitating removal. After the root is cut as indicated in Fig. 6, the blade is withdrawn and the tool head is reversed so that the severed weed is removed by scraping the claw along the ground, as illustrated in Fig. 7. The sharpened teeth 15 with their V-shaped meeting edges 16 disposed substantially tangentially to the ground, are particularly effective in grasping and removing the weed during this operation.

The claw also gives surprising results in pulling out other, less firmly rooted weeds, with a minimum damage to surrounding grass. It is particularly effective in removing clumps of "crab grass," which is a most troublesome parasitic growth which annually ruins numberless lawns throughout a large portion of the United States. Eradication of this form of grass heretofore usually required back-breaking effort on hands and knees, cutting out individual grass roots by means of a knife. With my improved tool, the shape and arrangement of the claw, affording a combined raking and cutting action between the V-shaped, curved teeth, renders removal of this form of grass a far simpler operation, whereby slight pressure, combined with a raking motion, will tear and cut out the entire clumps with their roots, in a manner wholly impossible with ordinary rakes or weeding devices.

When used for edging a lawn, the claw may be presented toward the operator, as shown in Fig. 8, and when the blade is inserted along the edge of the grass the claw forms a stop to limit the penetration of said blade, thereby assisting uniformity in depth of the trench. In other instances, it may be desirable to present the claw outwardly, especially when the abutting pavement is of concrete or masonry, in which case the claw serves to prevent the blade from contacting the side of the masonry and dulling its sharpened edges thereagainst.

The tool is also particularly useful for cultivating gardens and the like by both dragging and raking, for weeding and trimming around plants and shrubbery, and for planting, where shallow holes of uniform depth can be dug by the blade 20. When used for trimming and clearing out shrubbery and underbrush, the claw is especially useful in disentangling and removing the cuttings and debris.

The tool can further be used for cutting and trimming small branches of trees and shrubbery in the following manner:

The blade is adjusted to extend at an angle toward one or the other side of the claw as indicated in dotted lines in Fig. 3. The branch is cut by inserting the latter in the V formed between the sides of the claw and either cutting edge 25 or 26 of the blade as the case may be, and pushing the tool forwardly against the branch.

Although I have illustrated and described one particular embodiment of my invention, it will be understood that I do not wish to be limited to the exact construction shown and described, but that various changes and modifications may be made without departing from the spirit and scope of my invention as defined in the appended claims.

I claim as my invention:

1. A cultivating tool comprising in combination an elongated handle, a shank, a claw member curving outwardly from said shank, having a plurality of pointed teeth along its outer edge, the adjacent edges of said teeth meeting each other with sharpened cutting edges, a relatively flat blade attached to said shank and projecting beyond said claw member and having a sharpened cutting edge along its outer end, and means supporting said blade for longitudinally slidable and lateral swinging adjustment relative to said claw member.

2. A cultivating tool comprising in combination an elongated handle, a shank, a claw member curving outwardly from said shank, having a plurality of pointed teeth along its outer edge, the adjacent edges of said teeth meeting each other with sharpened cutting edges, a relatively flat blade member attached to said shank and projecting beyond said claw member and having a sharpened cutting edge along its outer end, one of said members having a longitudinally disposed slot and the other of said members having an axial support and a radially extending slot therein, and two adjustable bolts both extending through said slot and respectively engaged with said axial support and said curved slot in the other of said members to provide longitudinal and lateral swinging adjustment of said members with respect to each other.

3. A cultivating tool comprising in combination an elongated handle, a shank, a claw member curving outwardly from said shank, having a plurality of pointed teeth along its outer edge, the adjacent edges of said teeth meeting each other with sharpened cutting edges, a relatively flat blade attached to said shank and projecting beyond said claw member and having sharpened front and lateral edges, and means supporting said blade for longitudinally slidable and lateral swinging adjustment relative to said claw member.

4. A cultivating tool comprising in combination an elongated handle, a shank, a claw member curving outwardly and rearwardly from said shank having a plurality of pointed teeth along its outer and rearwardly facing edge, the adjacent edges of said teeth meeting each other with sharpened cutting edges, and a relatively flat, outwardly flaring blade attached to and projecting beyond the claw member and means for pivotally supporting said blade for lateral swinging adjustment relative to said claw member, the front and sides of said blade having sharpened cutting edges.

JOSEPH A. ROSEMAN.